United States Patent [19]

Olson et al.

[11] Patent Number: 4,611,040

[45] Date of Patent: Sep. 9, 1986

[54] FLUORIDE ION AS A CURING CATALYST FOR SILICON-CONTAINING RESINS

[75] Inventors: Kurt G. Olson, Gibsonia; William P. Blackburn, Evans City; Mark E. Endlish, Chicora, all of Pa.

[73] Assignee: PPG Industries, Inc., Pittsburgh, Pa.

[21] Appl. No.: 741,376

[22] Filed: Jun. 5, 1985

[51] Int. Cl.$^4$ ............................................. C08F 30/08
[52] U.S. Cl. ...................................... 526/279; 528/14; 528/18; 528/21; 528/23; 427/387; 427/388.1; 428/447; 428/450
[58] Field of Search .................... 528/21, 14, 18, 23; 526/279

[56] References Cited

U.S. PATENT DOCUMENTS

| | | | |
|---|---|---|---|
| 2,459,387 | 1/1949 | McGregor et al. | 528/21 |
| 3,812,081 | 5/1974 | Dennis et al. | 528/21 |
| 4,108,807 | 8/1978 | Hilterhaus | 521/118 |
| 4,173,551 | 11/1979 | Crivello | 528/14 |
| 4,230,814 | 10/1980 | Crivello | 528/14 |
| 4,328,137 | 5/1982 | Medford | 528/14 |
| 4,467,063 | 8/1984 | Lockhart | 524/106 |
| 4,472,564 | 9/1984 | Lockhart | 528/18 |

OTHER PUBLICATIONS

"Activation of Silicon-Hydrogen, Silicon-Oxygen, Silicon-Nigrogen Bonds in Heterogeneous Phase" by Corriu et al., Tetrahedron, vol. 39, No. 6, pp. 999-1009, 1983.

Abstract No. 73186d, "Polymerization or Organocyclosiloxanes in the Presence of Ionic Fluorides", *CA Selects Organosilicon Chemistry*, Issue 18, 1984, p. 10.

*Primary Examiner*—Melvyn I. Marquis
*Attorney, Agent, or Firm*—Thomas M. Breininger

[57] ABSTRACT

Disclosed is a composition comprising (A) a silicon-containing resin having in a molecule thereof at least one silicon atom connected to a hydrolyzable group and/or a hydroxyl group, and (B) a cure promoting catalyst system for the silicon-containing resin. The catalyst system comprises a compound containing a fluoride ion. Also disclosed is a composition comprising such a silicon-containing resin, and a catalyst system comprising a compound containing a fluoride ion in combination with an organotin compound.

12 Claims, No Drawings

FLUORIDE ION AS A CURING CATALYST FOR SILICON-CONTAINING RESINS

BACKGROUND OF THE INVENTION

This invention is directed to fluoride ion as a cure promoting catalyst for compositions containing silicon-containing resins. The compositions can be utilized as coating compositions as well as for other purposes. More particularly, this invention is directed to a composition containing a silicon-containing resin and fluoride ion as a cure promoting catalyst which composition can be cured at low temperature, preferably ambient temperature, to a film having an excellent combination of appearance and durability properties.

The coatings industry has been extensively involved in energy conservation activity for a number of years. Most coating compositions require an elevated temperature of at least about 120 degrees Celsius (°C.) for curing purposes. This represents a considerable expenditure of energy. Additionally, coating compositions which are intended for use in the automotive refinish area often times are applied under conditions such that the aforementioned elevated temperatures are not available for curing purposes. Ideally, the coating composition which can be cured at relatively low temperatures, for example, below about 82 degrees Celsius, and preferably at ambient temperature, would be most useful. Previous attempts to develop such coating compositions have resulted in compositions which were disadvantageously slow to cure and/or produced films which were deficient in one physical property or another.

Coating compositions containing various silicon-containing, film forming resins have been under study as possible alternatives to generally known coatings utilized in applications such as those requiring the coatings to cure to films having a combination of high performance properties. One reason for the interest in these resins is that silicon-containing film forming resins offer the possibility of developing coatings which can utilize atmospheric moisture for curing. Another is that they offer the possibility of an alternative curing mechanism to generally known curing mechanisms such as those which depend on isocyanates to achieve curing. However, there have been a number of problems associated with the utilization of silicon-containing resins which militate against the use of such film forming resins, especially in the high performance coatings area. Just one of the problems with the utilization of silicon-containing film forming resins in coatings applications has been the relatively long period of time that such resins can require to develop reasonably acceptable durability properties. This has been a serious drawback, for example, to the utilization of various silicon-containing film forming resins as moisture curable resins in high performance coatings applications as found, for example, in both automobile original equipment manufacture and in automobile refinishing.

Additionally, in a coating method known as "color plus clear" which is becoming increasingly popular, particularly in the automotive industry, the choice of film forming resins for such a coating system is often limited by the curing properties of the resin such as cure rate as well as final appearance and durability properties of the cured composite coatings produced utilizing this method. It would be desirable to provide a more useful range of film forming resins which could be advantageously utilized in the color plus clear method. Likewise, it would be desirable to provide improved curing rates for the coating compositions utilized in the color plus clear method.

In the color plus clear method (or color plus clear system), a substrate is coated with one or more applications of a pigmented basecoating composition to form a basecoat which thereafter is coated with one or more applications of an essentially clear topcoating composition to form a topcoat. There are several additional disadvantages with known color plus clear systems. After conventional basecoating compositions are applied to the substrate, a rather long period of time, on the order of about 30 minutes or more, may be required between the application of the conventional basecoating composition and the conventional topcoating composition. Such a period is needed to prevent adverse attack by components of the conventional topcoating composition, particularly solvents, on the basecoating composition at the interface of the two, a phenomenon often referred to as strike-in. Strike-in adversely affects the final appearance properties of the coated product. Strike-in is an especially serious problem when metallic flake pigments are employed in the basecoating composition. Strike-in, among other things, can destroy the desired metallic flake orientation in the basecoat.

The present invention is directed to alleviating these and other problems associated with the use of silicon-containing film forming resins, particularly in coatings applications, and more particularly in the area of high performance coatings applications.

SUMMARY OF THE PRESENT INVENTION

The present invention is for a curable composition comprising: (A) a silicon-containing resin having in one molecule at least one silicon atom connected to a hydrolyzable group and/or a hydroxyl group (i.e., thus Si—OH); and (B) an effective amount of a cure promoting catalyst system for the silicon-containing resin, which catalyst system contains a compound containing a fluoride ion.

The present invention also is for a curable composition comprising the aforesaid component (A) in combination with (B) an effective amount of a cure promoting catalyst system for the silicon-containing resin, which catalyst system contains a compound containing a fluoride ion in combination with an organotin compound.

DETAILED DESCRIPTION OF THE INVENTION

A composition of the invention contains (A) a silicon-containing resin having in one molecule at least one silicon atom connected to a hydrolyzable group and/or a hydroxyl group; and (B) an effective amount of a cure promoting catalyst system for the silicon-containing resin. The catalyst system contains a compound containing a fluoride ion. A preferred catalyst system contains the compound containing a fluoride ion in combination with an organotin compound.

The catalyst system for a composition of the invention contains a compound containing a fluoride ion (alternatively referred to herein as the "fluoride-containing compound"). The fluoride-containing compound can be a compound having an organic cation in combination with the fluoride anion as well as a compound having an inorganic cation in combination with the fluoride anion. It is to be understood that the catalyst system can contain a mixture of the aforesaid fluoride-containing compounds. The fluoride-containing compound should be soluble in a composition of the invention to an extent sufficient to provide effective, cure promoting, catalytic activity for the silicon-containing resin also present in a composition of the invention. Usually, a composition of the invention contains an organic solvent in the solvent system for the silicon-containing resin. Accordingly, the fluoride-containing compound usually will have a degree of solubility in such an organic solvent such that an effective amount of cure promoting, catalytic activity can be provided for the silicon-containing resin in the composition. Moreover, heterogeneous catalysis, wherein the fluoride-containing compound is substantially insoluble in a composition of the invention, is considered to be within the scope of the present invention.

Examples of the compound containing a fluoride ion in combination with an organic cation, which serves as the counterion for the fluoride ion in the compound, include compounds in which the organic cation contains an alkyl ammonium moiety having from 1 to 4 alkyl groups attached to the nitrogen atom in the alkyl ammonium moiety. Examples of such compounds include: tetrabutyl ammonium fluoride and benzyl trimethyl ammonium fluoride. Because of economic considerations, of the two immediately preceding examples, benzyltrimethyl ammonium fluoride is preferred. Benzyltrimethyl ammonium fluoride can be prepared, for example, by neutralizing benzyltrimethyl ammonium hydroxide present in a 40 percent by weight solution of benzyltrimethyl ammonium hydroxide in methanol with a solution of 49 percent by weight of hydrofluoric acid in water. Where desired, the water from the resulting product containing the benzyltrimethyl ammonium fluoride can be removed before utilizing the product for the catalyst system for the silicon-containing resin. A specific example of the preparation of benzyltrimethyl ammonium fluoride is provided infra.

Examples of the compound containing a fluoride ion in combination with an inorganic cation, which serves as the counterion for the fluoride ion in the compound, include inorganic compounds which are soluble in a composition of the invention to a degree sufficient to provide an effective amount of cure promoting catalyst for the silicon-containing resin in the composition. Examples of such fluoride-containing compounds having an inorganic cation in combination with the fluoride anion include compounds in which the inorganic cation is ammonium or a cation of a group IA metal of the Periodic Table or, in equivalent terminology, an alkali metal fluoride. Some specific examples of alkali metal fluorides include sodium fluoride, potassium fluoride and cesium fluoride.

The catalyst system for a composition of the invention may contain, in combination with the compound containing a fluoride ion, another catalyst for the silicon-containing resin of a composition of the invention. A preferred catalyst system for a composition of the invention contains the fluoride-containing compound in combination with an organotin compound such as tin salts of organic acids (e.g., carboxylic acids), examples of which include tin naphthenate, tin benzoate, tin octoate, tin butyrate, dibutyltin dilaurate, and dibutyltin diacetate. Of the aforesaid examples of tin salts of organic acids, dibutyltin dilaurate is preferred.

The amount of fluoride-containing compound in a composition of the invention may vary widely depending upon factors such as the rate of cure desired, the specific composition of the silicon-containing resin, the amount of moisture in the ambient atmosphere, and the like. However, a composition of the invention will contain an amount of the fluoride-containing compound sufficient to noticeably increase the rate of cure of the composition over the rate of cure that the composition would exhibit with a lesser amount of the fluoride-containing compound. As little as 0.001 percent by weight of fluoride-containing compound based on the total weight of silicon-containing resin in the composition has been shown to be effective in noticeably improving the cure response of the composition. Typically, the amount of fluoride-containing compound in a composition of the invention will be in a range of from 0.001 to 5 percent by weight, preferably from 0.01 to 2 percent by weight, based on the total weight of the silicon-containing resin. The upper amount of the fluoride-containing compound present in the composition essentially is limited only by the amount of fluoride-containing compound above which the benefits to be derived from the catalytic activity of the compound reach a point of diminishing returns considering such factors as the desired rate of cure and the particular type of composition in which the compound is being utilized. Usually, the desirable effects of utilization of the fluoride-containing compound can be achieved without exceeding in amount of 5 percent by weight of fluoride-containing compound based on the total weight of the silicon-containing resin present in the composition.

As discussed above, a preferred catalyst system for a composition of the invention contains the fluoride-containing compound in combination with an organotin compound such as a tin salt of an organic acid, representative examples of which are set forth above. The amounts of each of the fluoride-containing compound and organotin compound present in the composition also can vary widely. However, typically, when a composition of the invention contains both a fluoride-containing compound and an organotin compound, the amount of fluoride-containing compound will be in a range of from 0.001 to 5 percent by weight based on the total weight of the silicon-containing resin, and the amount of organotin compound will be in a range of from 0.1 to 10 percent by weight based on the total weight of the silicon-containing resin. Moreover, the ratio of the amount by weight of the fluoride-containing compound to the amount by weight of the organotin compound will vary depending on the cure response desired for the composition containing the particular silicon-containing resin. However, typically, the ratio of the amount by weight of fluoride-containing compound to the amount by weight of organotin compound will be in a range of from 1:100 to 10:1, preferably in a range of from 1:12 to 1:1.

As indicated previously herein, the catalyst system for a composition of the invention may contain, in combination with the compound containing a fluoride ion, one or more other optional catalysts for the silicon-containing resin of a composition of the invention. By way of illustration, other catalysts which optionally may be employed for the silicon-containing resin in a composition of the invention include: an organic acid, such as, for example, p-toluenesulfonic acid and n-butylphosphoric acid; metal salts of an organic acid such as iron stearate and lead octoate; and bases, such as, for example, isophorone diamine, methylene dianiline, imidazole, and aminosilanes such as gamma-aminopropyltriethoxysilane.

As set forth previously, a composition of the invention contains a silicon-containing resin having in one molecule at least one silicon atom connected to a hydrolyzable group and/or a hydroxyl group. It will be appreciated that a hydroxyl group connected to a silicon atom produces a silanol (≡Si—OH) group.

The choice of silicon-containing resin for a composition of the invention is not particularly limited. The catalyst system containing the fluoride-containing compound generally can be utilized in compositions containing a silicon-containing resin having in one molecule at least one silicon atom connected to a hydrolyzable group and/or a hydroxyl group. By way of illustration, examples of such silicon-containing resins can be found in U.S. Pat. Nos. 4,043,953; 4,429,082; 4,467,081; 4,446,292; 4,399,261; 4,191,713; 3,467,634; and 4,310,640; U.S. patent application Ser. No. 462,573 to Chang et al filed Jan. 31, 1983; as well as Japanese Patent Laid-Open Publication No. 36109 laid open Feb. 26, 1982; and European Patent Application, Publication No. 0,063,817 published Nov. 3, 1982.

By way of more specifically illustrating compositions of the invention, examples are described infra in which the silicon-containing resin is a silane addition interpolymer having alkoxy silane moieties and/or acyloxy silane moieties, which interpolymer is prepared by reaction of a mixture of monomers containing (i) at least one ethylenically unsaturated monomer which does not contain silicon atoms, referred to for convenience herein as an ethylenically unsaturated silicon-free monomer, and (ii) a copolymerizable ethylenically unsaturated alkoxy silane monomer and/or a copolymerizable ethylenically unsaturated acyloxy silane monomer. Examples of suitable ethylenically unsaturated silicon-free monomers for preparing such a silane addition interpolymer include alkyl acrylates, such as methyl acrylate, ethyl acrylate, butyl acrylate, propyl acrylate, 2-ethylhexyl acrylate, and 2-hydroxyethyl acrylate; alkyl methacrylates, such as methyl methacrylate, butyl methacrylate, 2-ethylhexyl methacrylate, 2-hydroxyethyl methacrylate, decyl methacrylate, and lauryl methacrylate; unsaturated nitriles such as acrylonitrile, methacrylonitrile and ethacrylonitrile; vinyl aromatic hydrocarbons such as styrene, alpha methyl styrene, and vinyl toluene; vinyl acetate; vinyl chloride; and epoxy functional monomers such as glycidyl methacrylate. Examples of copolymerizable ethylenically unsaturated alkoxy silane monomers and copolymerizable ethylenically unsaturated acyloxy silane monomers (collectively referred to herein as ethylenically unsaturated silane monomers) for preparing the aforesaid silane addition interpolymer include acrylatoalkoxysilanes such as gamma-acryloxypropyltrimethoxysilane and methacrylatoalkoxysilanes such as gamma-methacryloxypropyltrimethoxysilane, gamma-methacryloxypropyltriethoxysilane and gamma-methacryloxypropyltris-(2-methoxyethoxy)silane; acyloxysilanes including, for example, acrylato-, methacrylato- and vinyl-acetoxysilanes such as vinylmethyldiacetoxysilane, acrylatopropyltriacetoxysilane, and methacrylatopropyltriacetoxysilane. Examples of other copolymerizable ethylenically unsaturated alkoxy silane monomers include vinylalkoxysilanes such as vinyltrimethoxysilane, vinyltriethoxysilane and vinyltris(2-methoxyethoxy)silane. When a silane addition interpolymer is employed as the silicon-containing resin in a composition of the invention, the silane addition interpolymer generally is formed from about 50 percent to about 95 percent by weight of the ethylenically unsaturated silicon-free monomers and from about 5 percent to about 50 percent by weight of the ethylenically unsaturated silane monomers, based on the total weight of monomers utilized to prepare the silane addition interpolymer. Typically, the silane addition interpolymer is formed by interpolymerizing the ethylenically unsaturated silicon-free monomer or monomers with the ethylenically unsaturated silane monomers in the presence of a vinyl polymerization catalyst, examples of which include: azo compounds such as alpha alpha'-azobis(isobutyronitrile); peroxides such as benzoyl peroxide and cumene hydroperoxide; tertiary butyl peracetate; isopropyl percarbonate; butyl isopropyl peroxy carbonate; and similar compounds. The quantity of catalyst employed can be varied considerably; however, in most instances, it is desirable to utilize from about 0.1 to about 10 percent by weight of catalyst based on the total weight of monomers employed. A chain modifying agent or chain transfer agent may be added to the polymerization mixture. The mercaptans, such as dodecyl mercaptan, tertiary dodecyl mercaptan, octyl mercaptan, hexyl mercaptan and the mercaptoalkyl trialkoxysilanes such as 3-mercaptopropyltrimethoxysilane may be used for this purpose as well as other chain transfer agents such as cyclopentadiene, allyl acetate, allyl carbamate, and mercaptoethanol.

The polymerization reaction for the mixture of monomers to prepare a silane addition interpolymer, as described previously, can be carried out in an organic solvent medium utilizing conventional solution polymerization procedures which are well known in the addition polymer art as illustrated with particularity in, for example, U.S. Pat. Nos. 2,978,437; 3,079,434 and 3,307,963. Organic solvents which may be utilized in the polymerization of the monomers include virtually any of the organic solvents heretofore employed in preparing acrylic or vinyl polymers such as, for example, alcohols, ketones, aromatic hydrocarbons or mixtures thereof.

In addition to the foregoing components, namely the silicon-containing resin and the catalyst system, coating compositions of the invention may contain optional ingredients, various fillers; plasticizers; antioxidants; mildewcides and fungicides; surfactants; various flow control agents including, for example, thixotropes and additives for sag resistance and/or pigment orientation based on polymer microparticles (sometimes referred to as microgels) described, for example, in U.S. Pat. Nos. 4,025,474; 4,055,607; 4,075,141; 4,115,472, 4,147,688; 4,180,489; 4,242,384; 4,268,547; 4,220,679; and 4,290,932; and other such formulating additives. Additionally, where desired, compositions of the invention may contain various solvents and various pigments. As used herein, pigments include, for example, both metallic flake pigments and various white and colored pigments. Moreover, compositions of the invention may contain film forming thermoplastic and/or film forming thermosetting resins, examples of which include the generally known cellulosics, acrylics, aminoplasts, urethanes, polyesters, polyethers, epoxies or mixtures thereof.

Compositions of the invention may be utilized in a wide variety of applications, including but not limited to, coatings applications, sealant applications, adhesive applications, casting applications, etc. However, because of the ability of compositions of the invention to provide a particularly desirable combination of high performance advantages in cured films prepared therefrom, they are especially well suited for such high performance, coatings applications as found in the areas of automobile original equipment manufacture and automobile refinishing. Moreover, the compositions of the present invention have been found to be especially useful in the so-called "color plus clear" method of coating.

The compositions of the invention may be applied over a wide variety of substrates such as wood, metals, glass, cloth, plastics, foams and the like, as well as over primers. They can be applied by any known method, including brushing, dipping, flow coating, roll coating, curtain coating, etc., but they are most often applied by spraying. Conventional spray techniques and equipment can be utilized.

The examples which follow are submitted for the purpose of further illustrating the nature of the present invention and should not be regarded as a limitation on the scope thereof.

EXAMPLE I (a) This part illustrates a synthesis of a composition containing benzyl trimethyl ammonium fluoride.

A reaction vessel is charged with 460.5 grams (g) of a solution of 40 percent by weight benzyltrimethylammonium hydroxide in methanol. Next, 38.2 g of a 49 percent by weight solution of hydrogen fluoride in water is added dropwise through a plastic funnel over a period of about 10 minutes to the contents of the reaction vessel whereupon an exothermic reaction is observed to take place and a white precipitate is formed. The resulting product has a pH of 8.9. Next, a sufficient additional amount of the aqueous hydrogen fluoride solution is added to the product in the reaction vessel to bring the pH to 8.0. Next, the product in the reaction vessel is slowly added over a period of about 5 minutes to a vessel containing 1002.8 g of methyl trimethoxy silane whereupon a slight exotherm is observed. Thereafter the resulting product is filtered through a filter paper. The filtrate is a composition containing benzyl trimethyl ammonium fluoride. The filtrate has a total solids content measured for 1 hour at 110 degrees Celsius (°C.) at 30.8 percent by weight. It is calculated that 13.3 percent by weight of the filtrate consists of benzyl trimethyl ammonium fluoride.

(b) Compositions 1 through 15 are prepared from the following ingredients as set forth in the following Table 1. Compositions 1 through 15 are prepared by mixing well the ingredients at room temperature.

TABLE 1

| Composition | PDMS (18,000)[1] | PDMS (3,500)[2] | DBTDL[3] | BTMAF[4] | A-163[5] |
|---|---|---|---|---|---|
| 1 | 10.26 | — | — | 0.10 | — |
| 2 | 10.13 | — | — | 0.26 | — |
| 3 | 10.02 | — | — | 0.50 | — |
| 4 | 10.18 | — | — | 1.02 | — |
| 5 | 10.29 | — | — | — | 0.52 |
| 6 | 10.04 | — | 0.05 | — | 0.20 |
| 7 | 10.04 | — | 0.15 | — | 0.20 |
| 8 | — | 10.14 | — | 0.11 | — |
| 9 | — | 10.22 | — | 0.51 | — |
| 10 | — | 10.06 | — | 0.11 | 0.40 |
| 11 | 10.20 | — | 0.15 | — | 0.52 |
| 12 | — | 10.44 | 0.50 | — | 0.50 |
| 13 | — | 10.02 | 0.15 | 0.53 | — |
| 14 | — | 10.08 | 0.09 | 0.25 | — |

TABLE 1-continued

| Composition | PDMS (18,000)[1] | PDMS (3,500)[2] | DBTDL[3] | BTMAF[4] | A-163[5] |
|---|---|---|---|---|---|
| 15 | 5.48 | — | 0.05 | 0.05 | — |

[1]A silanol (i.e., ≡SI—OH) terminated polydimethyl siloxane having a viscosity at room temperature of 18,000 centipoises (cps) available as PS 345.5 from Petrarch Systems, Inc.
[2]A silanol terminated polydimethyl siloxane having a viscosity at room temperature of 3,500 cps available as PS 343.8 from Petrarch Systems, Inc.
[3]Dibutyl tin dilaurate.
[4]The filtrate of part (a) immediately above containing benzyl trimethyl ammonium fluoride.
[5]Methyl trimethoxy silane available as A-163 from Union Carbide Corp.

(c) A sample of each of compositions 1 through 15 of part (b) above is spread to a wet film thickness of about 1 to 2 millimeters (mm) on an aluminum panel at ambient temperature. The tack free times for the films are as set forth in the following Table 2. As used herein, a film is said to be tack free if it is observed to be nonsticky when touched with a finger. In Table 2, the "Film Number" refers to the number of the film prepared from the composition from Table 1 with the corresponding composition number.

TABLE 2

| Film Number | Tack Free Time (including comment where applicable) |
|---|---|
| 1 | Tack free in less than 15 minutes. |
| 2 | Tack free in about 15 minutes. |
| 3 | Slightly tacky after 24 hours. |
| 4 | Slightly tacky after 24 hours. |
| 5 | Still wet after 24 hours. No evidence of cure observed after 24 hours. |
| 6 | Tacky at about 24 hours.[1] |
| 7 | Tacky at about 24 hours.[2] |
| 8 | Tack free in about 85 minutes. |
| 9 | Tack free in about 15 minutes. |
| 10 | Still tacky at about 24 hours. |
| 11 | Tack free after 24 hours.[3] |
| 12 | Not recorded.[4] |
| 13 | Tack free and cured through the entire thickness of the film in less than 10 minutes. |
| 14 | Tack free in about 60 minutes.[5] |
| 15 | Tack free in about 60 minutes.[6] |

[1]The remainder of Composition 6 (about ¼ inch thick) left in an open jar gelled sometime within about 3 hours.
[2]The remainder of Composition 7 (about ¼ inch thick) left in an open jar gelled sometime within about 3 hours.
[3]The remainder of Composition 11 (about ¼ inch thick) left in an open jar gelled sometime within about 3 hours.
[4]The remainder of Composition 12 (about ¼ inch thick) left in an open jar gelled within about 40 minutes.
[5]The remainder of Composition 14 (about ¼ inch thick) left in an open jar gelled within about 45 minutes.
[6]Just after the film number 15 was spread on the aluminum panel, an additional 0.05 g of the filtrate of part (a) immediately above containing benzyl trimethyl ammonium fluoride is added to the remainder of Composition 15 in an open jar whereafter the composition is observed to gel in less than 5 minutes.

The above results would suggest that the catalyst composition containing tetramethyl ammonium fluoride acts to provide for rapid surface cure while the dibutyl tin dilaurate catalyst acts to provide for "through-cure".

EXAMPLE 2

(a) This part illustrates the preparation of an acrylic silane addition interpolymer. The following monomers are used:

| | Percent by Weight |
|---|---|
| methyl methacrylate | 50.0 |
| butyl acrylate | 30.0 |

| -continued | |
|---|---|
|  | Percent by Weight |
| gamma-methacryloxypropyl trimethoxysilane | 20.0 |

A reaction vessel equipped with condenser, stirrer, thermometer, dropping funnel and means for maintaining a nitrogen blanket is charged with 336.0 g butyl acetate, 144.0 g VM & P naphtha, and 96.0 g toluene. The contents of the vessel are then heated to reflux, about 119 degrees C., while under a nitrogen blanket and agitation. Three charges are next made simultaneously over a period of two hours while maintaining the vessel at reflux conditions. Charge I consists of a mixture of 1120.0 g methyl methacrylate, 672.0 g butyl acrylate and 448.0 g gamma-methacryloxypropyltrimethoxysilane. Charge II consists of 192.0 g butyl acetate and 56.0 g 2,2'-azobis-(2-methylisobutyronitrile) initiator. Charge III consists of 144.0 g butyl acetate and 112.0 g 3-mercaptopropyltrimethoxysilane chain transfer agent. The three charges are completed after two hours at which time a mixture of 24.0 g butyl acetate and 8.96 g 2,2'-azobis-(2-methylisobutyronitrile) is added. The contents of the vessel are maintained at reflux for another hour after which still another mixture of 24.0 g butyl acetate and 8.96 g 2,2'-azobis-(2-methylisobutyronitrile) is added. Thereafter, the contents of the vessel are allowed to reflux for 1.5 hours after which heating is discontinued and the contents of the vessel allowed to cool to room temperature.

The resultant product mixture containing acrylic silane addition interpolymer has a solids content measured for 2 hours at 150 degrees C. of 69.8 percent by weight, a viscosity of 10.0 Stokes and an acid value of 0.1. An analysis of the resultant product shows it to have a number average molecular weight of 2,196, a weight average molecular weight of 5,552 and a peak molecular weight of 4,884 as determined by gel permeation chromatography using a polystyrene standard.

(b) This part illustrates curing of films prepared from the resultant product containing acrylic silane addition interpolymer of part (a) above utilizing various catalyst systems or no catalyst.

Each of Compositions 16 through 22 is prepared by mixing 143 g of the resultant product of part (a) above with 57 g of methylamyl ketone to which the amount of catalyst (or no catalyst) is added as set forth in the following Table 3.

TABLE 3

| Composition | Catalyst | Amount (g) |
|---|---|---|
| 16 | Potassium fluoride solution[1] | 25 |
| 17 | Tetrabutylammonium fluoride solution[2] | 2 |
| 18 | Tetrabutylammonium fluoride solution[2] | 5 |
| 19 | Tetrabutylammonium fluoride solution[2] Dibutyltindilaurate | 5 3 |
| 20 | Benzyltrimethylammonium fluoride solution[3] Dibutyltindilaurate | 1.9 3 |
| 21 | No catalyst |  |
| 22 | Dibutyltindilaurate | 3 |

[1] A solution of 1 percent by weight of potassium fluoride in methanol.
[2] Prepared by diluting a solution of 29 percent by weight tetrabutylammonium fluoride in solvent (said solution obtained from Aldrich Chemical Company) with sufficient butanol to provide a concentration of 5 percent by weight of tetrabutylammonium fluoride.
[3] The filtrate of part (a) of Example 1 above containing benzyl trimethyl ammonium fluoride.

Each of compositions 16 through 22 is spray applied to each of two steel panels (thus 7 sets containing two panels each) treated with BONDERITE 40 and primed with a two component epoxy/polyamide primer available as DP 40/401 from DITZLER Automotive Finishes, PPG INDUSTRIES, INC., as follows. Each of the compositions is spray applied to each of the two panels using the same number of passes, the same type of spray gun employing the same nozzle setting and air line pressure so that sufficient coating composition is applied to each panel so as to provide a dry thin thickness (upon curing) of about 1.8 to 2.0 mils (about 0.046 to 0.051 millimeters).

The spray applied composition on one panel of each of the seven sets of panels is cured for 30 minutes at 250 degrees F. (121 degrees C.) and thereafter allowed to cool for 1 hour to ambient temperature. Thereafter, the Sward hardness, 20 degree gloss, distinctness of image (DOI) and solvent resistance is measured for the heat cured coating on each of these panels. The Sward hardness is again measured for the heat cured coating on each of these panels 24 hours after heat curing. The solvent resistance is measured by applying 20 back and forth finger rubs ("double rubs") of a paper towel dipped in xylene to the coating. A rating of "good" for solvent resistance means that the coating exhibited no dulling or softening after the 20 double rubs. Softening is measured by scratching the coating with a fingernail and observing for marring. A coating exhibiting no softening shows no marring in this scratch test. The results are as set forth in the following Table 4. An entry under the column "Sward Hardness" for the heat cured coating in the form such as "28/32" means that the Sward Hardness after the 1 hour period is 28 and the Sward Hardness after the 24 hour period is 32.

The spray applied composition on the other panel of each of the seven sets of panels is allowed to cure at ambient atmospheric conditions (74 degrees F., 23 degrees C.; 35 percent relative humidity). The tack free time is measured for each of the coatings allowed to cure at ambient conditions. The tack free time is that amount of time required such that when a finger is lightly pressed into the coating, the coating does not feel sticky and the coating shows no evidence of "fingerprinting". Also, 24 hours from the time the composition is spray applied, the 20 degree gloss, distinctness of image (DOI), Sward hardness and solvent resistance is measured for each of the coatings in the same manner employed for the heat cured coatings described above. The results are as set forth in the following Table 4.

TABLE 4

| | Coating | Sward Hardness | 20 Deg Gloss | DOI | Tack Free Time | Solvent Resistance |
|---|---|---|---|---|---|---|
| 16 | 250° F./30 min. | 28/32 | 45 | 20 | — | Good |
|  | Ambient cure | 10 | 55 | 20 | 1 hr. | Good |
| 17 | 250° F./30 min. | 14/18 | 7 | 0 | — | Good |
|  | Ambient cure | 2 | 9 | 0 | 5 min. | Good |
| 18 | 250° F./30 min. | 20/20 | 30 | 0 | — | Good |
|  | Ambient cure | 8 | 22 | 0 | 3 min. | Good |
| 19 | 250° F./30 min. | 38/44 | 80 | 80 | — | Good |
|  | Ambient cure | 18 | 90 | 80 | 1 hr. | Good |
| 20 | 250° F./30 min. | 48/48 | 81 | 80 | — | Good |
|  | Ambient cure | 16 | 80 | 75 | 1 hr. | Good |
| 21 | 250° F./30 min. | 8/8 | 73 | 90 | — | None |
|  | Ambient cure | 0 | 70 | 55 | None | None |
| 22 | 250° F./30 min. | 34/36 | 74 | 70 | — | Good |
|  | Ambient cure | 20 | 80 | 80 | 3 hr. | Good |

What is claimed is:
1. A curable composition comprising:

(A) A silicon-containing resin having in one molecule at least one silicon atom connected to a hydrolyzable group and/or a hydroxyl group; and (B) an effective amount of a cure promoting catalyst system for the silicon-containing resin, which catalyst system contains a compound containing an organic cation in combination with a fluoride ion.

2. The curable composition of claim 1 wherein said organic cation contains an alkyl ammonium moiety having from 1 to 4 alkyl groups attached to the nitrogen atom in said moiety.

3. The curable composition of claim 2 wherein said organic cation is selected from the group consisting of tetrabutyl ammonium cation and benzyltrimethyl ammonium cation.

4. The curable composition of claim 1 wherein said compound containing a fluoride ion is present in said composition in an amount of from 0.001 to 5 percent by weight based on the total weight of said silicon-containing resin.

5. A curable composition comprising:
(A) A silicon-containing resin having in one molecule at least one silicon atom connected to a hydrolyzable group and/or a hydroxyl group; and
(B) an effective amount of a cure promoting catalyst system for the silicon-containing resin, which catalyst system contains a compound of an inorganic cation selected from the group consisting of an ammonium cation and a cation of an alkali metal in combination with a fluoride ion which compound is soluble in said composition.

6. The curable composition of claim 5 wherein said compound having an inorganic cation in combination with said fluoride ion is selected from the group consisting of sodium fluoride, potassium fluoride and cesium fluoride.

7. A curable composition comprising:
(a) A silicon-containing resin having in one molecule at least one silicon atom connected to a hydrolyzable group and/or a hydroxyl group; and
(B) an effective amount of a cure promoting catalyst system for the silicon-containing resin, which catalyst system contains a compound containing a fluoride ion and an organotin compound.

8. The curable composition of claim 7 wherein said organotin compound is an organotin salt of a carboxylic acid.

9. The curable composition of claim 7 wherein said compound containing a fluoride ion is present in said composition in an amount of from 0.001 to 5 percent by weight based on the total weight of said silicon-containing resin, and said organotin compound is present in said composition in an amount of from 0.1 to 10 percent by weight based on the total weight of said silicon-containing resin.

10. The curable composition of claim 9 wherein the ratio of the weight of said compound containing a fluoride ion to the weight of said organotin compound is in a range of from 1:100 to 10:1.

11. A curable composition comprising:
(A) A silicon-containing resin which is a vinyl polymer having in one molecule at least one silicon atom connected to a hydrolyzable group and/or a hydroxyl group; and
(B) an effective amount of a cure promoting catalyst system for the silicon-containing resin, which catalyst system contains a compound containing a fluoride ion.

12. The curable composition of claim 11 wherein said vinyl polymer is an addition interpolymer containing alkoxy silane groups and/or acyloxy silane groups, said addition interpolymer derived from the reaction of a mixture of monomers wherein the mixture of monomers comprises
(i) from about 50 percent to about 95 percent of at least one ethylenically unsaturated silicon-free monomer, and
(ii) from about 5 percent to about 50 percent of a copolymerizable ethylenically unsaturated silane monomer selected from the group consisting of an alkoxy silane monomer, an acyloxy silane monomer, and a mixture thereof.

* * * * *